United States Patent [19]
Hazen

[11] 4,089,243
[45] May 16, 1978

[54] CHEESE MAKING APPARATUS

[75] Inventor: Gretz L. Hazen, Fort Atkinson, Wis.

[73] Assignee: DEC International, Inc., Madison, Wis.

[21] Appl. No.: 683,830

[22] Filed: May 6, 1976

[51] Int. Cl.² .......................... B26D 3/24; B26D 1/38
[52] U.S. Cl. .................................... 83/161; 83/356.3; 83/599; 83/693
[58] Field of Search ................... 83/55, 112, 161, 355, 83/356.3, 599, 687, 693, 40, 42

[56] References Cited
U.S. PATENT DOCUMENTS

| | | | |
|---|---|---|---|
| 2,582,154 | 1/1952 | Papendick | 83/356.3 |
| 3,361,171 | 1/1968 | Tiby | 83/112 |

*Primary Examiner*—Willie G. Abercrombie
*Attorney, Agent, or Firm*—Andrus, Sceales, Starke & Sawall

[57] ABSTRACT

An apparatus for the continuous matting and milling of cheese curd. The apparatus includes a housing which houses an upper, water-permeable, endless conveyor belt and a lower endless conveyor belt which operates in the opposite direction to that of the first belt. A mixture of cheese curd and whey is deposited as a layer on the upper belt and the whey is drained through the belt and is discharged through the lower end of the housing. The matted curd is transferred from the upper belt to the lower belt and as a result is inverted, and is subsequently discharged to a curd milling unit which acts to cut the mat of curd into cube-like chunks. The curd mill includes a cylindrical drum and a blade extends the length of the drum and is spaced outwardly from the drum periphery. A series of radial knives connect the blade and the drum. The drum is rotated through an arc between a cutting position wherein the blade and knives cut the curd mat into cube-like chunks and a retracted position where the chunks fall by gravity from the drum to a collection site.

4 Claims, 13 Drawing Figures

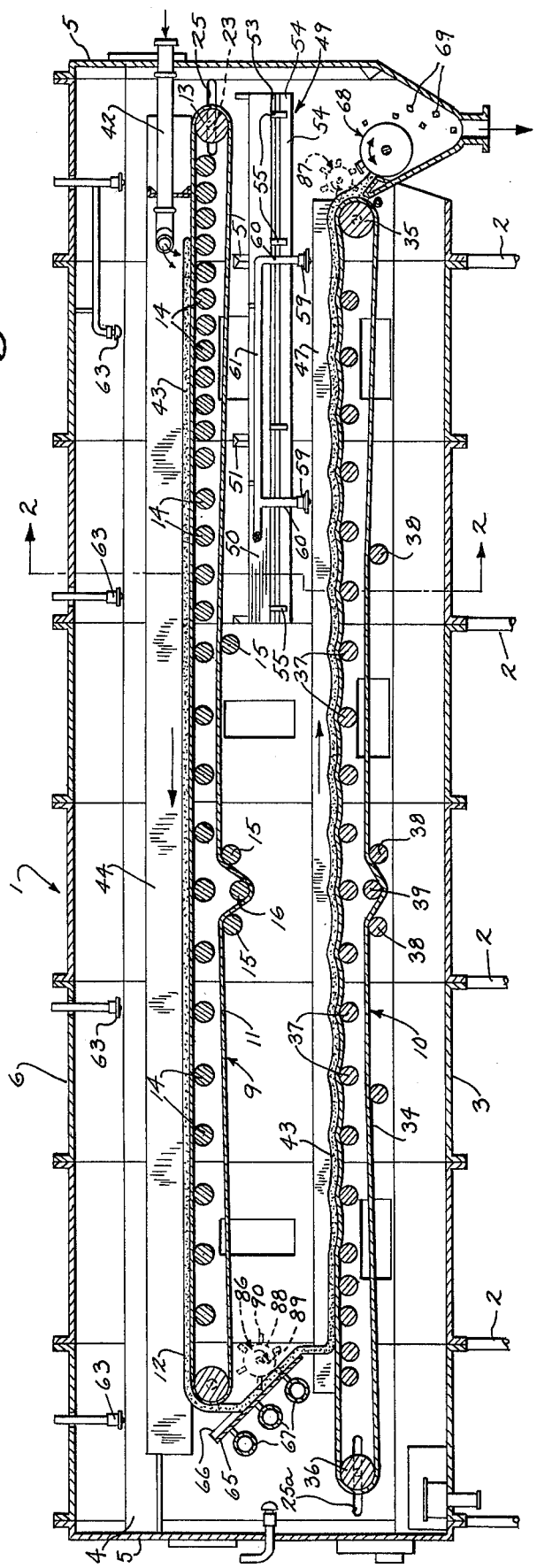
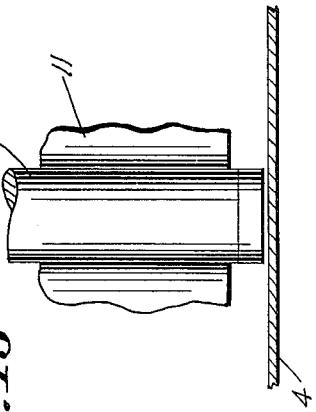
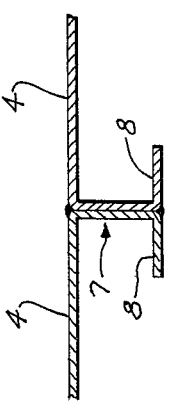

CHEESE MAKING APPARATUS

BACKGROUND OF THE INVENTION

In the past, cheese, such as cheddar or colby, has been manufactured in an open-top vat and after draining of the whey from the vat the curd is cut into slabs or blocks which are hand turned or inverted and stacked to drain the residual whey from the slabs. Subsequently, the curd slabs are transferred to a curd mill where they are cut into cube-shaped chunks, and the chunks are transferred to hoops or drums for pressing and aging.

The conventional process of manually cutting and matting the curd slabs requires considerable labor, and as the curd slabs are exposed during the matting process there is a possibility of contamination of the curd by outside materials.

U.S. Pat. No. 3,636,630 describes a continuous process of cheese making in which a mixture of curds and whey is deposited on an inclined perforated conveyor which acts to separate the whey from the curd and discharges the curd upon the uppermost of two non-porous endless belt conveyors. As the curd moves over the uppermost conveyor, it is matted and the curd mat is transferred to the lower conveyor, and in doing so, is inverted. As the mat of curd is discharged from the lower conveyor, a guillotine knife cuts the mat into strips, and the strips are then conveyed to a curd milling machines where it is milled into cube-like chunks.

SUMMARY OF THE INVENTION

The invention relates to an apparatus for continuously processing cheese curd and more particularly to an apparatus for continuously matting and milling cheese curd.

The apparatus of the invention includes a housing which houses an upper, water permeable, endless conveyor belt and a lower endless conveyor belt which operates in the opposite direction from that of the upper belt conveyor. A mixture of curd and whey is deposited as a layer on the upper belt and the whey is drained through the belt and discharged from the lower end of the housing.

The matted curd is transferred from the upper conveyor to the lower conveyor and as a result of the transfer, is inverted. On discharge from the lower conveyor, the curd mat is passed through a milling unit which acts to cut the curd mat into cube-like chunks.

The curd mill is of novel construction and includes a cylindrical drum which is located adjacent the discharge end of the lower conveyor belt. A cutting blade extends the length of the drum and is spaced outwardly from the drum periphery, while a series of radially extending knives connect the blade and the drum.

The drum is adapted to be rotated through an arc between a cutting position, wherein the blade and knives cut the curd mat into cube-like chunks, to a retracted position wherein the cut chunks which adhere to the drum surface fall by gravity from the drum to a collection site.

As the entire mechanism, including the conveyors and the curd mill, are contained within the housing, the entire mechanism can be readily cleaned in place by an automatic washing system after each day's operation, and this substantially reduces the time and labor involved in cleaning the equipment.

Because the entire mechanism is enclosed by the housing, a more sanitary operation is achieved, for it minimizes the possibility of contamination of the cheese curd by foreign materials.

The apparatus enables the curd to be matted and milled in a continuous operation, thereby increasing the capacity of the cheese making facility and reducing the space and equipment requirements.

As a further advantage, the process provides better control over the moisture content of the curd and thereby results in a more uniform end product.

The curd mill as used in the apparatus of the invention is of simple construction and less expensive in cost than curd mills used in the past. Only one moving part is required. The curd mill acts to cut the curd slab into cube-like chunks in a single operation and this is a decided improvement over curd mills as used in the past which included either complicated and expensive grid-like cutting mechanisms or alternately, required a two-stage operation including the use of two separate machines and a transfer mechanism.

Other objects and advantages will appear in the course of the following description.

DESCRIPTION OF THE DRAWINGS

The drawing illustrate the best mode presently contemplated of carrying out the invention.

In the drawings:

FIG. 1 is a vertical section of the apparatus of the invention;

FIG. 5 is a section taken along line 5—5 of FIG. 4;

FIG. 13 is a fragmentary horizontal section showing a weighted tensioning roll.

DESCRIPTION OF THE ILLUSTRATED EMBODIMENT

Figure 3:
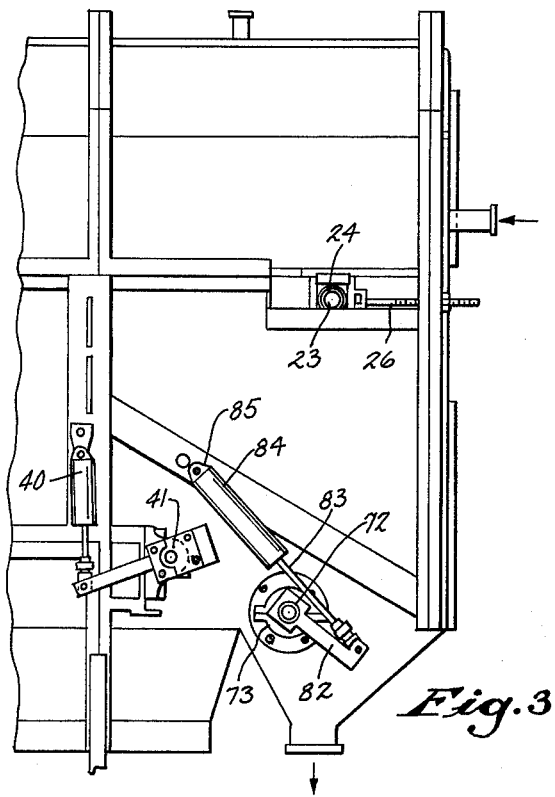
FIG. 3 is an enlarged fragmentary side elevation of a portion of the apparatus.

The drawings illustrate an apparatus for continuously matting and milling cheese curd. The apparatus, as shown in FIG. 1 includes an enclosed housing 1 which is supported on a series of legs 2. The housing 1 includes a bottom wall 3 formed of a pair of sloping surfaces which are joined together along a central valley or depression, a pair of side walls 4, a pair of end walls 5 and a top wall 6 which connects the upper edge portions of the side walls and end walls. The walls of the housing 1 are reinforced or stiffened by a series of ribs 7, and the ribs are formed by welding the channel-shaped flanges 8 of the wall panels in a back-to-back relation, as best shown in FIG. 5. This construction provides a smooth inner surface for the housing, and the welded channel flanges 8 act as stiffening ribs to reinforce the housing.

Located within the housing 1, are a pair of endless belt conveyors 9 and 10, which are positioned in vertically spaced relation. The upper conveyor 9 includes an endless belt 11 formed of a water-permeable material and is mounted for travel on a drive roll 12 and an idler roll 13. The belt 11 is supported in its upper path of travel by a series of support rolls 14 and is supported in its lower path of travel by a group of rolls 15. Tension is applied to the belt 11 through use of a weighted roll 16 which is freely supported by the belt 11. As shown in FIG. 13, plastic plugs 17 extend outwardly from the ends of the roll 16 and ride against the side walls 4 of the housing 1. By utilizing rolls 16 of different weights, the tension on the belt 11 can be varied so that the upper path of travel of belt 11 can be substantially planar, or can be undulating, with the belt dipping as it passes between adjacent rolls.

Figure 2:
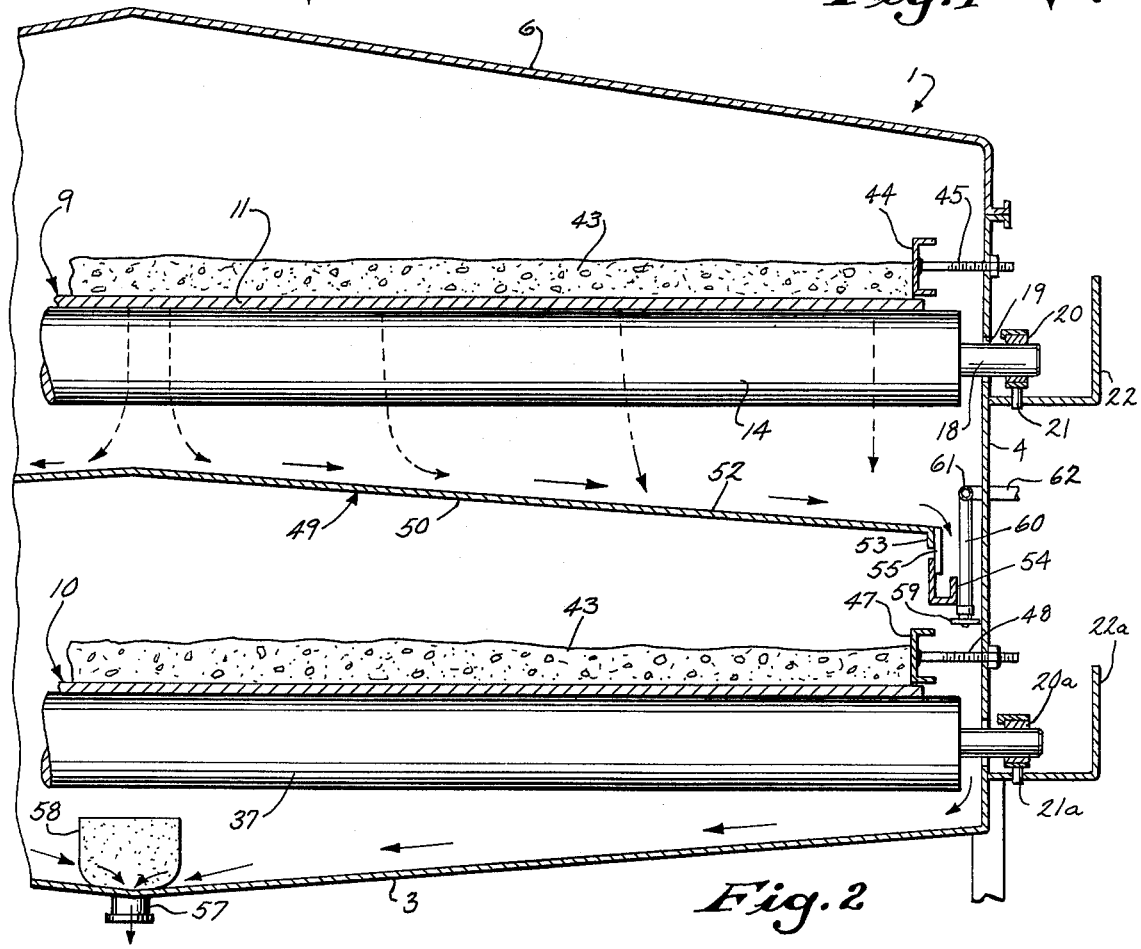
FIG. 2 is en enlarged fragmentary transverse section taken along line 2—2 of FIG. 1.

The rolls 14 are mounted for rotation, as best illustrated in FIG. 2. Each roll includes a shaft 18 which extends outwardly through openings 19 in the respective side walls 4, and the ends of each shaft are journalled within bearing assemblies 20 mounted in a supporting brackets 21. The brackets on each side of the housing are mounted in a generally L-shaped trough 22 which is connected to the outer surface of the respective side wall 4. During the matting operation any whey which is drained from the curd and passes through the openings 19 will be collected in the trough 22 and can be discharged from the trough to a suitable drain. Similarly, during the clean-in-place operation, any cleaning liquid which passes through the openings 19 will similarly be collected in the torugh 22.

The idler roll 13 for belt 11 is carried by shaft 23 and the ends of the shaft are journalled within bearing blocks 24. As best shown in FIG. 1, the shaft 23 extends through horizontal slots 25 in the side walls 4 and the position of the idler roll 13 can be varied to adjust the tension on the belt 11 through adjustment of the threaded rods 26 which are connected to the bearing blocks 24. By adjustment of rods 26, the bearing blocks 24 can be moved within suitable guides on the side walls 4 to vary the position of the idler roll 13.

Figure 4:
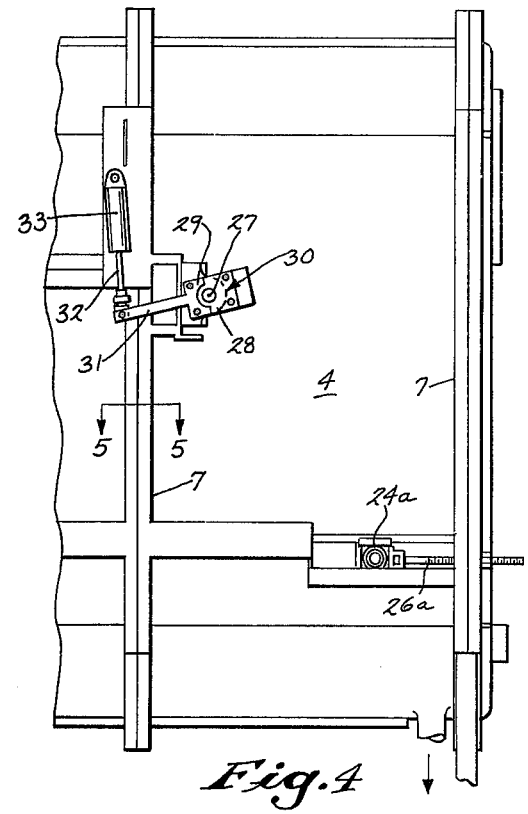
FIG. 4 is an enlarged fragmentary side elevation of a portion of the apparatus.

The conveyor belt 11 is moved in its endless path by a stepping type of drive mechanism which is operably connected to drive roll 12. As shown in FIG. 4, the drive roll 12 is mounted on a shaft 27 and the ends of the shaft are journalled within bearing assemblies 28 located on the outer surfaces of the respective side walls 4. One end of shaft 27 is connected to block 29 by a conventional pawl and ratchet mechanism, not shown in detail, but indicated by 30. With this mechanism a ratchet gear is connected to shaft 27 and a pawl is associated with block 29. An arm 31 connects the block 29 with the lower end of a piston rod 32 that is slidable within a fluid cylinder 33 and the upper end of the cylinder is pivotally connected to the housing 1 through a bracket. With this construction, extension of the piston rod 32 will pivot the arm 31 and block 29 to thereby rotate the shaft through a predetermined arc and advance the belt 11 in a step or increment which, generally, in practice, is about 1 inch. The pawl and ratchet mechanism 30 locks the shaft 27 against reverse rotation on retraction of the piston rod 32. The fluid cylinder 33 is designed so that the movement of the piston rod in a direction to advance the belt 11 is relatively slow, while opposite movement of the piston rod, which is not transmitted to the belt, is relatively fast. With this drive construction, the belt 11 will be advanced with a speed generally in the range of about 4 to 18 inches per minute.

The lower conveyor 10 is similar in construction to the upper conveyor 9 and includes an endless permeable belt 34 which is mounted for travel on a drive roll 35 and an idler roll 36. The construction of rolls 35 and 36 is similar to that of rolls 12 and 13 of upper conveyor 9. Belt 34 is supported in its upper path of travel by a series of rolls 37, which are similar in structure to rolls 14, and is supported in its lower path of travel by a group of rolls 38 and a weighted tensioning roll 39, which are similar to rolls 15 and 16 previously described. As shown in FIG. 2, the rolls 37 are mounted for rotation in a manner similar to that of rolls 14. The roll shafts are journalled in bearing units 20a carried by brackets 21a that extend upwardly from trough 22a.

The lower belt 34 is driven or advanced with a step-like action by a drive mechanism including a fluid cylinder 40 which is connected to the shaft 41 of drive roll 35 through a pawl and ratchet mechanism, as described with respect to drive roll 12 of the upper conveyor 9.

The tension on belt 34 can be varied in a manner similar to that described with respect to belt 11. The shaft of idler roll 35 extends through slots 25a in side walls 4 and are journalled in bearing blocks 24a, the position of which can be adjusted by threaded rods 26a. Se FIG. 4.

A mixture of curd and whey is deposted on the belt 11 of the upper conveyor 9 through an inlet pipe 42, which extends through an opening in one end of the end walls 5. The mixture of curd and whey flows across the belt 11 in the form of a relatively thick layer or mat 43 and the whey drains downwardly through the belt.

To retain the layer 43 of curd on the belt 11, side plates 22 are mounted along the side edges of the belt 11 and the belt travels beneath the plates. The plates 44 are mounted from the side walls 4 by adjustable brackets 45. By adjusting the position of the brackets, the position of the side plates 44 can be varied to thereby vary the width of the curd layer 43. In addition, a cross plate 46 extends between the plates 44 and serves as a dam to prevent the curd layer 43 from flowing rearwardly with respect to the direction of movement of the belt 11. As shown in FIG. 1, the inlet pipe 42 extends through an opening in the cross plate 46.

Side plates 47 are mounted from side walls 4 through brackets 48 and extend along the side edges of the belt 34 of the lower conveyor 10 and function in the manner of plates 44 to retain the layer of curd on the lower belt 34.

The belts 11 and 34 are preferably formed of a woven plastic filaments or strands such as polyester filaments. However, other types of perforated or permeable belts can be employed, such as perforated stainless steel, wire mesh, or the like. In general, the belts have a porosity such that about 30 to 35% of the total area of the belt is open and the whey will drain downwardly through the belt.

Located beneath the upper conveyor 9 is a whey deflecting unit 49, which includes a baffle or roof 50 that is suspended from cross beams 51 that extend between the side walls 4. The roof 50 is composed of a pair of upwardly sloping surfaces 52 which meet along a central ridge. As shown in FIG. 2, the side edges of the surfaces 52 are provided with downwardly extending flanges 53. Whey draining through the porous belt 11 will fall onto the sloping surfaces 52 and drain downwardly along the surfaces.

As illustrated in FIG. 2, positioned beneath each flange 53 is a trough 54 which is connected to the roof 50 by a series of straps 55. The whey draining from the roof will be collected within the troughs 54 and will be discharged from the open ends of the troughs and flow downwardly along the side walls 4 to the bottom wall 3 to be discharged through a drain pipe 57 in one end of the bottom wall 3. A suitable strainer 58 is associated with the drain to strain out curd particles from the whey.

While the drawings show the baffle or roof 50 extending only a portion of the length of the upper conveyor 9, it is contempalted that in some installations the baffle can extend the full length of the conveyor 9.

In order to clean the underside of the baffle or roof 50, a series of spray nozzles 59 are mounted along the sides of the baffle and have water outlets that are directed upwardly and inwardly so as to contact the inner surface of the baffle 50. Each nozzle 59 is connected to a vertical pipe 60 which, in turn, is connected to header 61. The washing liquid is supplied to the header through an inlet pipe 62.

In addition, to the spray nozzles 59, a series of spray nozzles or fixtures 63 are located in the upper end of the housing and are connected to pipes 64 that also communicate with a source of washing liquid. The entire mechanism located in the housing can be cleaned in place by discharge of the cleaning liquid through the nozzles 59 and 63.

As the layer 43 of cheese curd moves or advances along the upper belt 11, the curd mats and the mat or slab of curd is discharged from the upper conveyor 9 and transferred to the lower conveyor 10 which is moving in the opposite direction. The transfer mechanism includes an inclined plate 65 which is located beneath the drive roll 12 and the curd mat being discharged from the upper conveyor 9 is deflected downwardly by the inclined plate onto the lower conveyor 10. Side flanges 66 are associated with the transfer plate 65 to guide the mat 43 of curd in movement across the plate. As shown in FIG. 1, the inclined plate 65 is supported by a series of supports 67 which extend between the side walls 4.

As the curd mat passes around the drive roll 12 and onto the inclined transfer plate 65, the curd is stretched and the stretching action is desirable in improving the body of the cheese. In addition, by use of properly weighted rolls 16 and 39, the layer of curd on the belts 11 and 34 can be made to move in an undulating path, thereby providing a stretching action for the curd mat, as illustrated with respect to the lower conveyor 10 in FIG. 1.

The curd mat 43 being discharged from the lower conveyor 10 passes through a curd mill 68 which acts to cut the mat of curd into cube-like chunks 69 which are discharged through a hopper 70 in housing 1 and subsequently introduced into hoops or drums for pressing.

Figure 6:
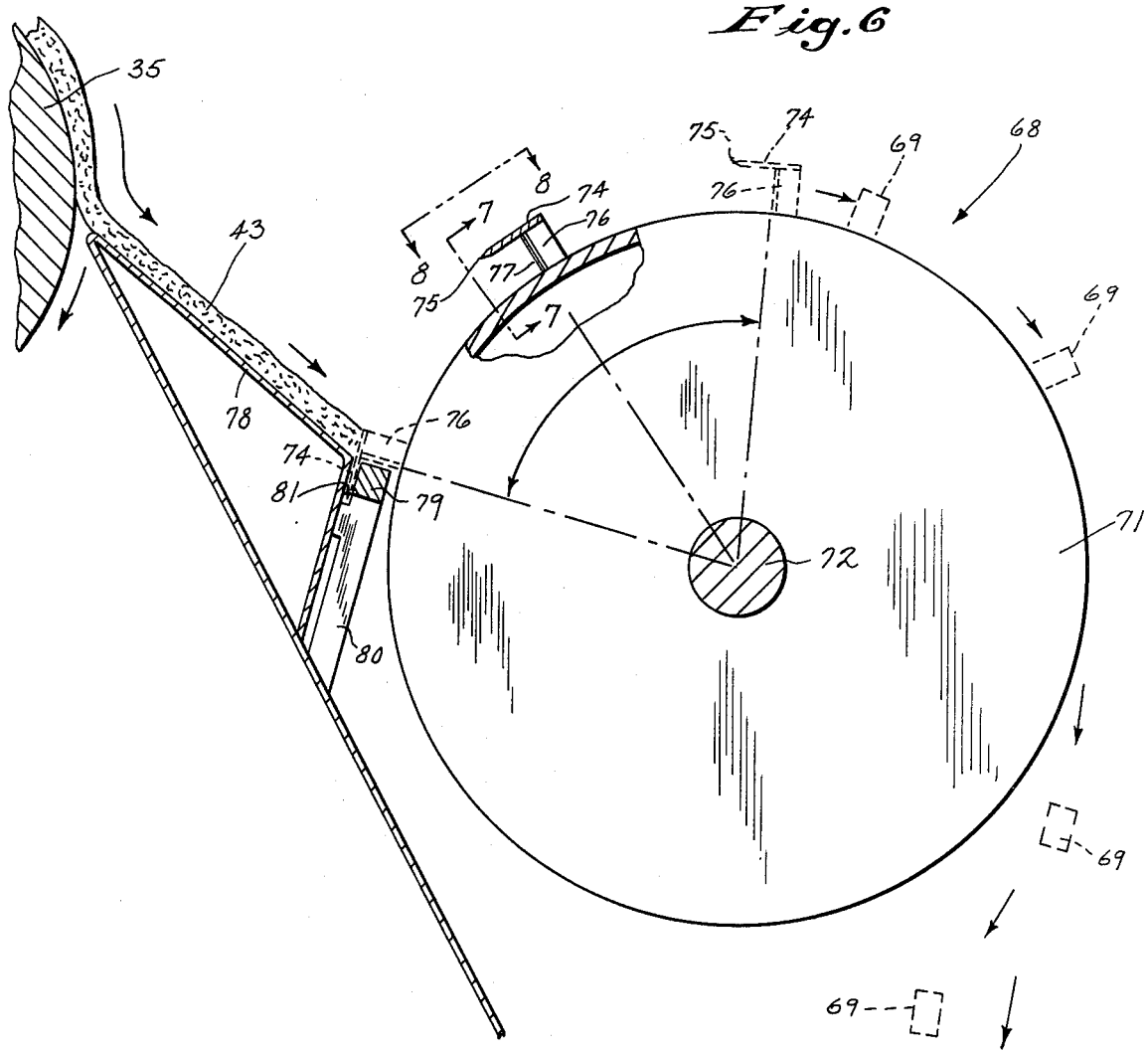
FIG. 6 is a side elevation of the curd mill and a portion of the curd conveyor.
Figure 7:
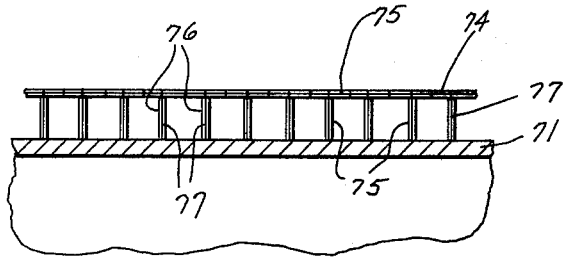
FIG. 7 is a section taken along line 7—7 of FIG. 6.
Figure 8:
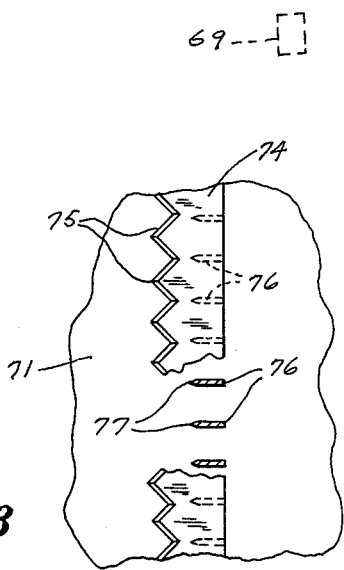
FIG. 8 is a section taken along line 8—8 of FIG. 6.

The curd mill 68 is best illustrated in FIGS. 6–8, and includes a cylindrical drum 71 which is carried by a shaft 72 and the ends of the shaft are jouranlled within bearing assemblies 73 mounted on the side walls 4. A cutting blade 74 extends the length of the drum 71 and is spaced radially outward of the periphery of the drum. As shown in FIG. 6, blade 74 is provided with a sharpened, serrated, cutting edge 75.

Connecting the blade 74 with the periphery of the drum, are a plurality of radially extending, parallel knives 76 each having a sharpened edge 77, and the knives 76 extend along the entire length of the blade 74.

The curd mat being discharged from the conveyor 10 passes over an inclined plate 78, and a cut-off bar 79 is located between the lower end of the plate 78 and the periphery of the drum 71. Bar 79 is supported from the housing by a series of spaced supports 80 and the bar 79 is spaced from the plate 78 to provide a recess 81 that receives the blade 74 during the cutting stroke. As illustrated in the drawings, the drum 71 is mounted to rotate through an arc of about 80° between a cutting position (shown in full line in FIG. 6) and a retracted or non-operating position (shown in phantom in FIG. 6), which is on the opposite side of a vertical plane passing through the axis of the drum from the cutting position.

To drive the drum in its oscillating movement, one end of an arm 82 is connected to the shaft 72 and the opposite end of arm 82 is attached to a piston rod 83 which is mounted for sliding movement within a fluid cylinder 84. A shown in FIG. 3, the upper end of cylinder 84 is pivotally connected to the housing 1 through a lug 85. With this construction, extension and retraction of the piston rod 83 will rotate the drum 71 and cutting mechanism between the cutting and the retracted positions.

Figure 9:
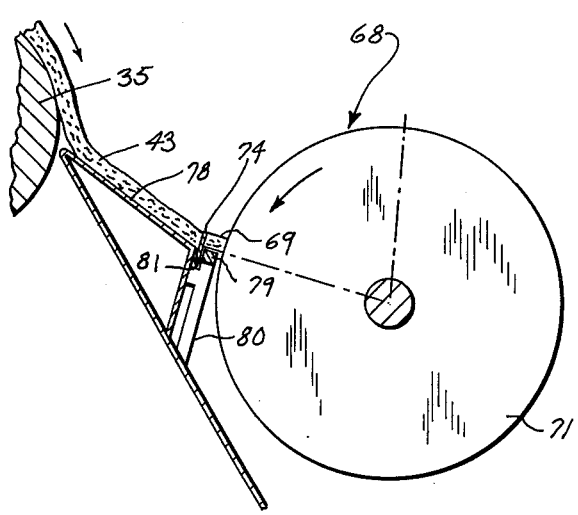
FIG. 9 is a schematic view showing the blade of the curd mill in a first forward cutting stroke.
Figure 10:
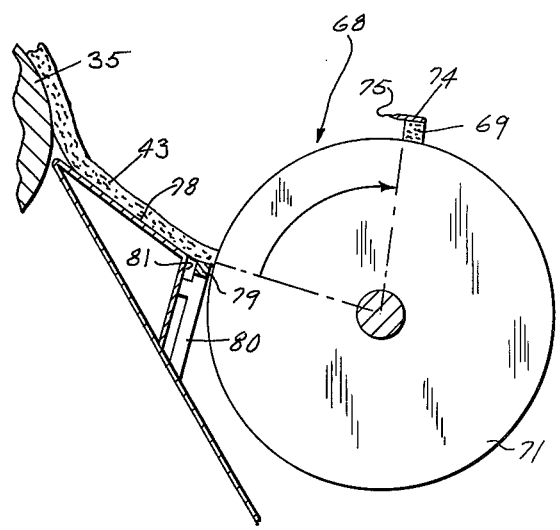
FIG. 10 is a view similar to FIG. 7 showing the blade in a first retracted stroke.
Figure 11:
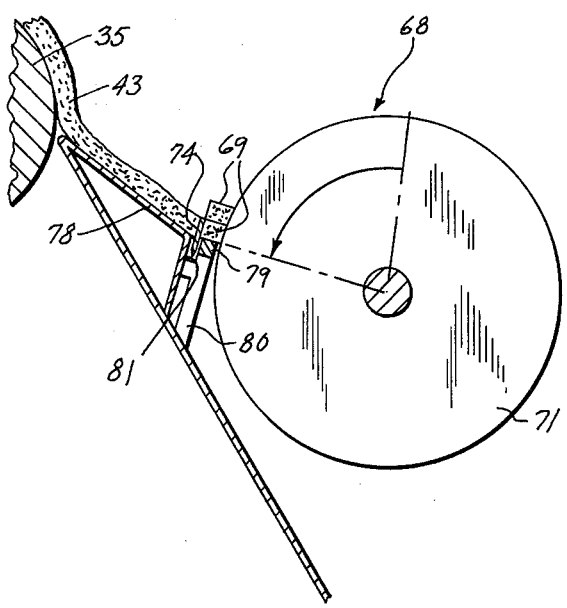
FIG. 11 is a view similar to FIG. 7, showing the blade in a second cutting stroke.
Figure 12:
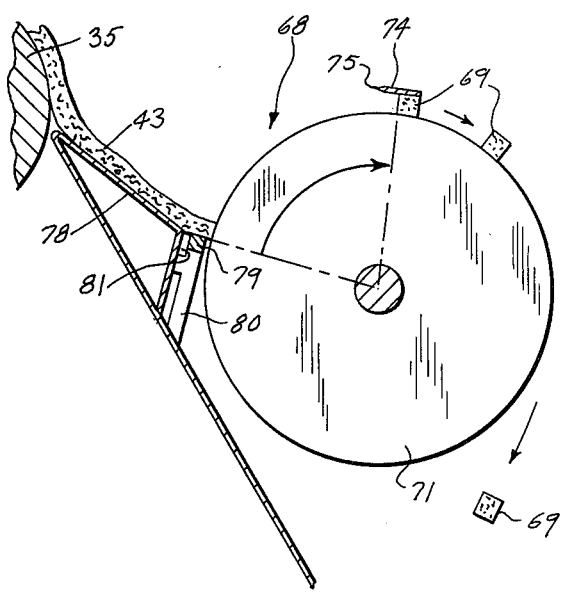
FIG. 12 is a view similar to FIG. 7 showing the blade in a second retracted stroke and the chunks of curd being discharged from the drum surface.

FIGS. 9 - 12 illustrate schematically the operation of the curd mill. Rotation of the drum toward the cutting position, as shown in FIG. 9, will cause the blade 74 to slice a strip from the end of the curd mat 43 and the knives 76 will sever the strip into a series of small cube-like chunks. On return movement of the drum to the retracted position, as shown in FIG. 10, the cube-like chunks will adhere to the surface of the drum and remain in position between the series of knives 76. On the second forward stroke, as shown in FIG. 11, the blade 74 will again sever a strip from the end of the curd mat and as the blade moves through the curd, the curd chunks 69 which were located between the knives 76 are forced outwardly from the spaces between the knives and adhere to the surface of the drum. On the second return stroke, as shown in FIG. 12, the chunks which were dislodged from between the knives will fall by gravity from the periphery of the drum and into the hopper 70.

With the curd mill as used in the invention only a single movable element is utilized which not only cuts a strip from the end of the curd mat, but also severs the strip into cube-like chunks. By varying the speed of rotation of the drum, the width of the strip being cut by the blade 74 can be varied to thereby vary the size of the chunks 69. For example, if the speed oscillation of the drum 71 is increased, the strip being cut from the mat of curd will be correspondingly reduced. One dimension of the curd chunks 69 will be equal to the thickness of the curd mat; a second dimension of the curd chunks will be equal to the spacing between the knives 76; and a third dimension of the curd chunks, which is variable, is determined by the relative speed of the curd mat and the drum.

As the entire mechanism, including the matting conveyors 9 and 10 and the curd mill 68 are enclosed within the housing 1, a more sanitary processing operation is achieved which minimizes the possible contamination of the curd by foreign materials. Moreover, all of the equipment contained within the housing 1 can be cleaned after the operation has been concluded through use of the clean-in-place spray nozzles. The upper nozzles 63 will flush and clean the conveyors and curd mill, and the nozzles 59 act to clean the underside of the deflecting baffle or roof 50. Any cleaning solution which is sprayed through the holes 19 for the roll shafts, or the slots 25, is collected in the outer troughs 22 and conducted to a suitable drain.

The continuous matting operation eliminates the manual chore of cutting and stacking the curd slabs, as required in the past, thereby providing better control over the process and resulting in a more uniform end product.

The curd mill 68 operates to cut the curd mat 43 into cube-like chunks in a single operation. The curd mill is of simple construction and is less expensive than conventional mills and is also capable of being readily cleaned-in-place after the operation is concluded.

While the drawings have illustrated the apparatus of the invention as being used in continuously matting and milling cheese curd, it is contemplated that the apparatus can also be employed for making granular curd. When making granular curd, the curd mill 68 is not incorporated in the apparatus and instead a a pair of agitating units 86 and 87, shown in phantom in FIG. 1, are employed to agitate the curd on the belt 34 and prevent it from matting. Each of the units 86 and 87 includes a drum 88 which is carried by shaft 89 that is journalled within the side walls 4 of the housing. Extending outwardly from the periphery of each drum are a number of tines or fingers 90 which engage the curd on the belt and serve to agitate the curd and prevent it from matting.

Various modes of carrying out the invention are contemplated as being within the scope of the following claims particularly pointing out and distinctly claiming the subject matter which is regarded as the invention.

I claim:

1. A curd mill, comprising a drum mounted for oscillating movement about its axis, means to deliver a mat of curd to the drum and including a supporting surface terminating adjacent the periphery of said drum, the width of the curd mat being generally parallel to the axis of the drum, curd cutting means mounted on the drum and including a blade extending generally parallel to the axis of the drum and spaced from the periphery of the drum to cut a strip from the end of the curd mat, and having a series of generally parallel knives interconnecting the blade and the periphery of the drum, said cutting means being mounted for cooperating cutting action with said surface, drive means for oscillating the drum between an inoperative position to an operative position wherein said cutting means cooperates with said surface to cut said mat into a plurality of cube-like chunks, said operative position being located on one side of a vertical plane extending through the axis of the drum and said inoperative position being located at a higher level than said operative position and on the opposite side of said vertical plane, and means for discharging said chunks outwardly from the periphery of the drum when said drum is in the inoperative position.

2. The curd mill of claim 1, wherein the drive means is arranged to move the cutting means to the operative position in a first cutting stroke to cut a plurality of first chunks, and is arranged to move the cutting means to the inoperative position in a first return stroke with said first chunks remaining in the spaces between said knives, said drive means also arranged to move the cutting means to the operative position in a second cutting stroke to cut a plurality of second chunks from said mat, said first chunks being dislodged from said spaces as the cutting means is moved in said second cutting stroke, said first chunks being supported on the periphery of the drum, said drive means being further arranged to move the cutting means to the inoperative position in a second return stroke to effect gravity discharge of said first chunks from the periphery of the drum.

3. A curd mill, comprising a drum mounted for oscillating movement about its axis, conveying means for continuously delivering a matt of curd to the drum and including a curd supporting surface, curd cutting means mounted on the drum and including a blade extending generally parallel to the axis of the drum and spaced from the periphery of the drum to cut a strip from the end of the curd matt and said cutting means having a series of generally parallel knives interconnecting the blade and the periphery of the drum, a cut-off surface forming an extension to said supporting surface and disposed in the path of travel of said knives, and drive means for oscillating the drum between an inoperative position and an operative cutting position wherein said cutting means cooperates with said cut-off surface to cut said matt into a plurality of cube-like chunks, said operative position being located on one side of a vertical plane extending through the axis of the drum and said inoperative position being located on the opposite side of said vertical plane, said chunks being dislodged from the spaces between knives during the next succeeding cutting stroke and the dislodged chunks falling from the surface of the drum by gravity when the drum is moved to the inoperative position.

4. The curd mill of claim 3, wherein the blade extends circumferentially in a direction toward said operative position beyond the knives and said cut-off surface is spaced from said supporting surface to provide a clearance that receives said blade when the drum is moved to the operative position.

* * * * *